(12) United States Patent
Trager

(10) Patent No.: US 8,451,376 B1
(45) Date of Patent: May 28, 2013

(54) AUTOMATIC GAIN CONTROL (AGC) FOR ANALOG TV SIGNALS USING FEED-FORWARD SIGNAL PATH DELAY

(75) Inventor: David S. Trager, San Marcos, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/454,234

(22) Filed: Apr. 24, 2012

(51) Int. Cl.
*H04N 5/21* (2006.01)

(52) U.S. Cl.
USPC .......................................................... 348/540

(58) Field of Classification Search
USPC ................. 348/540, 678, 679, 528, 547, 536, 348/497, 614, 684, 725, 726; 375/371, 232; 455/232.1
See application file for complete search history.

(56) References Cited

U.S. PATENT DOCUMENTS

| | | | |
|---|---|---|---|
| 4,271,427 A | 6/1981 | Van Den Driessche | |
| 5,374,962 A | 12/1994 | Klink | |
| 5,564,092 A * | 10/1996 | Grandfield et al. | 455/232.1 |
| 6,005,640 A * | 12/1999 | Strolle et al. | 348/726 |
| 6,052,157 A | 4/2000 | Weihs | |
| 6,496,227 B1 | 12/2002 | Lemaitre | |
| 6,535,553 B1 * | 3/2003 | Limberg et al. | 375/232 |
| 6,760,078 B2 * | 7/2004 | Limberg | 348/614 |
| 7,050,491 B2 * | 5/2006 | McDonald et al. | 375/232 |
| 7,259,799 B2 * | 8/2007 | Kuhn et al. | 348/684 |
| 7,697,067 B2 | 4/2010 | Lim et al. | |
| 7,710,500 B2 | 5/2010 | Byeon et al. | |
| 8,023,830 B2 * | 9/2011 | Iannelli | 398/182 |
| 8,174,621 B2 | 5/2012 | Jang et al. | |
| 8,237,863 B2 | 8/2012 | Jang | |
| 8,238,443 B2 | 8/2012 | Jang et al. | |

OTHER PUBLICATIONS

Wikipedia, "Composite Video", Feb. 2012, 4 pgs.

* cited by examiner

*Primary Examiner* — Paulos M Natnael
(74) *Attorney, Agent, or Firm* — O'Keefe, Egan, Peterman & Enders LLP

(57) ABSTRACT

Systems and methods are disclosed for automatic gain control (AGC) for analog television signals using feed-forward signal path delay. Adjustments to the AGC frequency response are achieved by introducing an intentional delay in the signal path of sufficient length to allow time for measurement of a horizontal sync pulse level and for application of a feed-forward amplitude correction based upon this measurement to the same horizontal line.

21 Claims, 5 Drawing Sheets

AUTOMATIC GAIN CONTROL (AGC) FOR ANALOG TV SIGNALS USING FEED-FORWARD SIGNAL PATH DELAY

TECHNICAL FIELD OF THE INVENTION

This invention relates to automatic gain control for analog television signals.

BACKGROUND

In an analog TV (ATV) receiver, the automatic gain control (AGC) function is used to regulate the amplitude of the video signal and reject amplitude disturbances that occur in the transmission channel. Disturbances in the channel caused by constructive/destructive interference due to multipath propagation are often referred to as "flutter." A common cause of flutter is moving objects, such as airplanes, that introduce a time varying flutter with frequencies ranging from a few Hz to a few kHz. Other causes of amplitude disturbances in the transmission channel are nonlinear distortions that convert frequency or phase of the signal into amplitude modulations and power supply modulations. These amplitude disturbances are commonly caused by poor TV signal amplifiers.

Many ATV signals have a periodic component that is used for synchronization of the video information to the display apparatus. Video information is displayed by drawing horizontal lines on the screen from left to right, and top to bottom. Each video line has a horizontal synchronization pulse (Hsync), and each video field (a multiple of video lines) has a vertical synchronization pulse (Vsync). The Hsync pulses have consistent amplitudes and are often used as reference levels for video AGCs. The video AGC measures the Hsync level, while ignoring the video content.

Because a single measurement is made for each line, the video AGC can be considered to be a discrete-time system, with a sample rate equal to the line frequency (typically 15,625 Hz or 15,750 Hz). The Hsync measurement is compared against a "target" that represents the desired amplitude level. The error between the Hsync measurement and the target is filtered and used to adjust the signal gain in an effort to drive the amplitude error to zero. Both feedback and feed-forward gain control can be provided.

FIG. 1 (Prior Art) is a block diagram of an embodiment 100 for AGC circuitry associated with an integrated TV receiver circuitry that demodulates incoming TV signals. The AGC circuitry includes a programmable feedback (FB) amplifier 102, a programmable feed-forward (FF) amplifier 106, and amplifier control circuitry 108. In operation, baseband TV signals 101 are provided to programmable FB amplifier 102, which outputs a signal to demodulator (DEMOD) 104. The demodulator (DEMOD) 104 outputs demodulated TV signals to the programmable FF amplifier 106, and the programmable FF amplifier 106 outputs demodulated and gain adjusted signals 107 that can be further processed, as desired. It is noted that the demodulator (DEMOD) 104 can be an analog TV (ATV) demodulator that removes analog signal modulations included on over-air television broadcasts.

The amplifier control circuitry 108 receives an output 109 from the demodulator (DEMOD) 104 at a detector 110. The detector 110 outputs an indication of the amplitude for the demodulated signal to a block 112 that converts the amplitude into a logarithmic value. For the feedback (FB) loop, this logarithmic value 113 is provided as a negative input to adder 124, which also receives a FB target value 126. The adder outputs a feedback error value 127 to a feedback filter ($H_{FB}$) 128, which in turn provides a filtered feedback error value to an anti-log block 130. The anti-log block 130 converts the error value from a logarithmic value to a linear value, which is provided to ramp generator 132. Ramp generator 132 then provides a feedback amplitude correction signal 133 to the FB amplifier 102. For the feed-forward (FF) loop, the logarithmic value 113 is provided as a negative input to adder 114, which also receives a FF target value 116. The adder outputs a feed-forward error value 117 to a feed-forward filter ($H_{FF}$) 118, which in turn provides a filtered feed-forward error value to an anti-log block 120. The anti-log block 120 converts the error value from a logarithmic value to a linear value, which is provided to ramp generator 122. Ramp generator 122 then provides a feed-forward amplitude correction signal 123 to the FF amplifier 106.

One aspect of the AGC circuitry is that the gain adjustment is made after the Hsync level measurement. This operation has the consequence of introducing a one-line delay in the AGC loop. This is represented in FIG. 2 (Prior Art).

FIG. 2 (Prior Art) is a signal flow diagram 200 that represents the transfer function for the demodulator AGC circuitry of embodiment 100 in the logarithmic domain. Delay block ($Z^{-1}$) 204 represents a one-line delay caused by the discrete-time sampling of the Hsync level. The feedback loop filter response ($H_{FB}$) is represented by block 228, and the feed-forward loop filter response ($H_{FF}$) is represented by block 218. The adders 202 and 206 represent the programmable FB amplifier 102 and the programmable FF amplifier 106, respectively.

It is noted that the transfer function of the AGC loop is depicted in FIG. 2 (Prior Art) can be represented as follows:

$$H(z) = \frac{1 - (H_{ff})z^{-1}}{1 - (H_{fb})z^{-1}}$$

Each filter ($H_{FB}$ and $H_{FF}$) can be considered a second order bi-quad. With the sampling delay in the loop, the general form of the overall AGC transfer function can be represented as follows:

$$H(z) = \frac{1 + (b_1)z^{-1} + (b_2)z^{-2} + (b_3)z^{-3} + (b_4)z^{-4}}{1 + (a_1)z^{-1} + (a_2)z^{-2} + (a_3)z^{-3} + (a_4)z^{-4}}$$

A consequence of the sampling delay is that there is a non-zero amplitude response for some frequencies. In fact, some frequencies will have gain larger than 0 dB which means that the amplitude disturbance is increased at those frequencies. An example amplitude response is shown with respect to FIG. 4 (Prior Art), and this amplitude response represents the relative attenuation versus frequency that is seen by the amplitude disturbance FIG. 3 (Prior Art) is a representative signal diagram 300 for an incoming TV signal in the form of a CVBS (Color, Video, Blanking, and Sync) signal including two horizontal lines 302 and 304. According to the standard CVBS signal format, a first horizontal line (N) 302 includes a horizontal sync tip signal 306, a color calibration signal (chroma burst) 308, and visible color content information 310. Similarly, the next horizontal line (N+1) 304 includes a horizontal sync tip signal 316, a color calibration signal 318, and visible color content information 320. The horizontal sync tip signals 306 and 316 are typically implemented as a negative pulse with a standard magnitude. As such, the magnitude of these horizontal sync tip signals 306 and 316 can be detected, as represented by blocks 312 and 322, and then can be used to determine a magnitude adjustment for the incoming CVBS signals. As depicted, this gain adjustment can be applied during remaining portion of the horizontal lines, as represented by elements 314 and 324. As such, regardless of how the gain is applied during the horizontal line (e.g., a step, a ramp, etc.), the effect of the gain change 314 made in the first horizontal line (N) 302 is not detected, as indicated by block 322, until the next horizontal sync tip 316. Similarly, the effect of the gain change 322 made in the next horizontal line (N+1) 304 would not detected until the following horizontal sync tip. This delay in applying the gain corrections can generate undesirable results in the resulting image.

FIG. 4 (Prior Art) is a signal diagram 400 for a frequency response 402 for a typical AGC in demodulation circuitry for TV signals, such as CVBS signals. The frequency response 402 includes a low-frequency notch region that blocks low-frequency signals and a high-frequency pass region that allows high-frequency signals to pass. As depicted, region 406 indicates a large negative response with respect to 0 db, which is represented by dashed line 420, and this region applies to low-frequency signals. In contrast, region 404 represents a smaller positive response with respect to 0 db that is applied to high-frequency signals. It is noted that the x-axis 410 represents frequency, and the y-axis 412 represents gain adjustments provided by the filter response 402. It is also noted that the cross-over frequency 422 can be 1 kHz, for example, although other cross-over frequencies could also be utilized.

The gain reduction provided by the low-frequency notch, as represented by region 406, operates to block low-frequency noise such as noise from power supplies and/or airplane flutter. The positive gain provided by the high-pass response, as represented by region 404, amplifies high-frequency noise. Traditionally, if the gain of the high-pass portion 404 is made smaller, then the gain reduction of the low-frequency notch portion 406 is undesirably narrowed, thereby increasing low-frequency noise and causing significant noise problems. In contrast, if the gain reduction of the low-frequency notch portion 406 is enhanced, then the high-pass portion 404 will become greater and further amplify the high-frequency noise, potentially giving rise to performance problems from high-frequency noise. Thus, there is a trade-off between the stop-band depth and/or width of the low-frequency notch and the high-frequency gain. As this depth and/or width of the notch is increased in region 406, the high-frequency gain in region 404 also increases. This increase can cause problems for downstream signal processing, such as video decoding, that rely on accurate synchronization to horizontal and vertical sync signals. While it is desirable to increase the depth and width of the low frequency rejection in region 406, such an adjustment is limited by the maximum high frequency gain in region 404 that can be tolerated by the downstream signal processing.

SUMMARY OF THE INVENTION

Systems and methods are disclosed for automatic gain control (AGC) for analog television signals using feed-forward signal path delay. Adjustments to the AGC frequency response to improve high-frequency performance are achieved by introducing an intentional delay in the signal path of sufficient length to allow time for measurement of a horizontal sync pulse level, or other periodic component within the television signals, and for application of a feed-forward amplitude correction based upon that measurement to be made to the same horizontal line. Other features and variations could also be implemented, as desired, and related systems and methods can be utilized, as well.

Disclosed embodiments include an automatic gain control system for analog television signals, including demodulator circuitry, amplitude detector circuitry, feed-forward error correction circuitry, feed-forward amplitude correction circuitry, delay circuitry, and amplifier circuitry. The demodulator circuitry is configured to receive a modulated analog television (ATV) signal and to output a demodulated ATV signal. The amplitude detector circuitry is configured to measure amplitude levels for periodic components within a plurality of horizontal lines for the demodulated ATV signal and to output amplitude level indication signals. The feed-forward error correction circuitry is configured to compare the amplitude level indication signals to a target feed-forward amplitude level and to generate feed-forward error signals. The feed-forward amplitude correction circuitry is configured to receive the feed-forward error signals and to generate feed-forward amplitude correction signals. The delay circuitry is configured to receive the demodulated ATV signal and to output a delayed version of the demodulated ATV signal after a delay amount, and amplifier circuitry. The amplifier circuitry is configured to receive the delayed version of the demodulated ATV signal, to receive the feed-forward amplitude correction signals, and to amplify the delayed version of the demodulated ATV signal based upon the feed-forward amplitude correction signals such that an amplitude level before the periodic component within each horizontal line is adjusted based upon the periodic component within that horizontal line.

In further disclosed embodiments, the periodic components can be horizontal synchronization pulse signals. And the horizontal lines can further include visible color content information positioned after the horizontal synchronization pulse signals. Still further, the amplitude correction signal for each horizontal line can be a ramped correction signal applied across at least a portion of the horizontal line. The amplitude correction signal for each horizontal line can also be a stair-step correction signal applied at a position within the horizontal line. In addition, the feed-forward amplitude correction circuitry can include interpolator circuitry configured to generate amplitude correction signals based upon a second order or higher interpolation of the feed-forward error signals. Further, the modulated ATV signals can be CVBS (Color, Video, Blanking, and Sync) signals. Still further, the delay circuitry can include buffer circuitry configured to store at least a portion of each horizontal line.

Further embodiments include feedback error correction circuitry, feedback amplitude correction circuitry, and feedback amplifier circuitry configured to receive the feedback amplitude correction signals and to apply them to the modulated ATV signal. The feedback error correction circuitry is configured to compare the amplitude level indication signals to a target feedback amplitude level and to generate feedback error signals. The feedback amplitude correction circuitry is configured to receive the feedback error signals and to generate feedback amplitude correction signals And the feedback amplifier circuitry is configured to receive the feedback amplitude correction signals and to apply them to the modulated ATV signal.

Disclosed embodiments also include a method for gain control of analog television signals, including demodulating a modulated ATV signal to produce a demodulated ATV signal, detecting amplitude levels for periodic components within a plurality of horizontal lines for the demodulated ATV signal, comparing the amplitude levels to a target feed-forward amplitude level to produce feed-forward error signals, generating feed-forward amplitude correction signals based upon the feed-forward error signals, delaying the demodulated ATV signal by a delay amount to produce a delayed version of the demodulated ATV signal, and amplifying the delayed version of the demodulated ATV signal based upon the feed-forward amplitude correction signals such that an amplitude level before the periodic component within each horizontal line is adjusted based upon the periodic component within that horizontal line.

In further disclosed embodiments, the method can include detecting amplitude levels for horizontal synchronization pulse signals within the horizontal lines. Still further, the method can include generating an amplitude correction signal for each horizontal line that is a ramped correction signal applied across at least a portion of the horizontal line. The method can also include generating an amplitude correction signal for each horizontal line that is a stair-step correction signal applied at a position within the horizontal line. Still further, the method can include generating an amplitude correction signals based upon a second order or higher interpolation of the feed-forward error signals. In addition, the modulated ATV signals can be CVBS (Color, Video, Blanking, and Sync) signals. And the method can also include providing a delay by storing at least a portion of each horizontal line in buffer circuitry.

Further embodiments include comparing the amplitude levels to a target feedback amplitude level to produce feedback error signals, generating feedback amplitude correction signals based upon the feedback error signals, and amplifying the modulated ATV signal based upon the feedback amplitude correction signals.

Other features and variations could also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1:
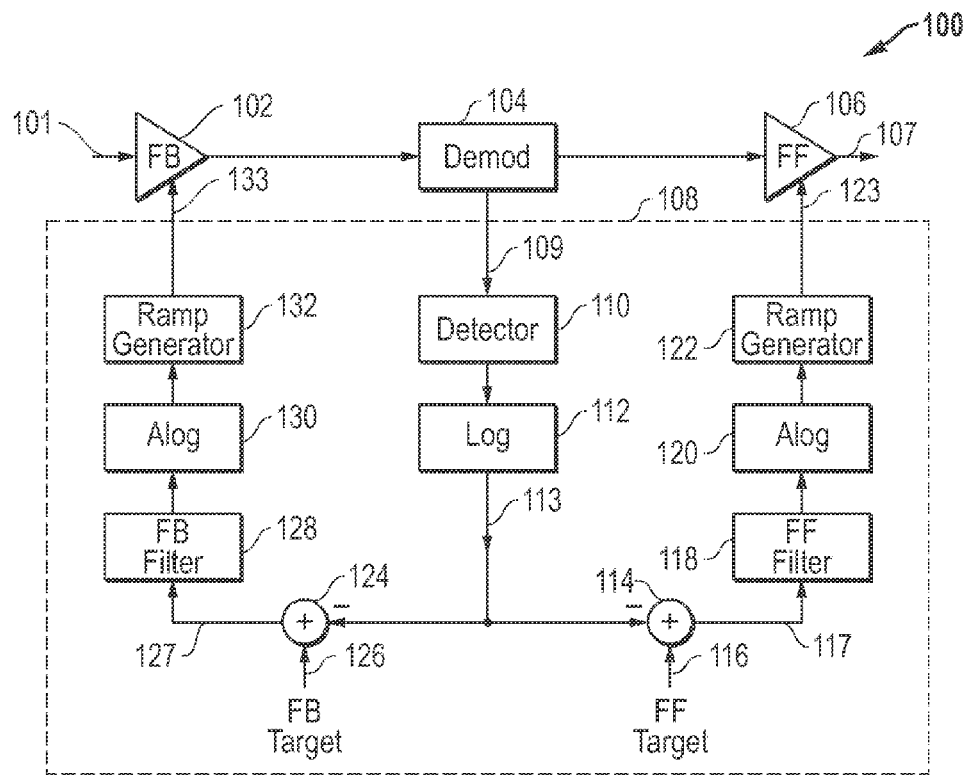
FIG. 1 (Prior Art) is a block diagram of an embodiment for automatic gain control (AGC) circuitry associated with a television (TV) signal demodulator.

Systems and methods are disclosed for automatic gain control (AGC) for analog television signals using feed-forward signal path delay. Adjustments to the AGC frequency response are achieved by introducing an intentional delay in the signal path of sufficient length to allow time for measurement of a horizontal sync pulse level, or other periodic component within the television signals, and for application of a feed-forward amplitude correction based upon this measurement to be made to the same horizontal line. Other features and variations could also be implemented, as desired, and related systems and methods can be utilized, as well.

As described herein, the video portion of an analog television signal typically includes the video content that is visible on the television (TV) display and also includes synchronization information that is used by the TV circuitry to format the content appropriately for display. The synchronization information has prescribed levels that can be used by video AGC (automatic gain control) circuitry to regulate the amplitude of the video signal. This amplitude control is desirable because the video signal can experience amplitude modulation in the transmission channel. The information that is often used for amplitude level detection is the amplitude of the horizontal sync-tip signal, which occurs at the horizontal line rate (e.g., 15-16 kHz). Using the horizontal sync-tip level makes the video AGC act as a sampled data system, with sampling rate equal to the horizontal line rate. The AGC measures the horizontal sync-tip level and computes a gain value appropriate to correct the level to a prescribed level.

However, as described above for conventional video AGCs, this amplitude correction occurs after the horizontal sync-tip has passed. This delayed correction introduces a delay into the adjustment control loop for the sync-tip level. This delay makes it difficult, if not impossible, to independently adjust low-frequency and high-frequency amplitude components. Thus, when high-frequency modulation is present, any positive gain to this high-frequency modulation can cause problems for the video decoder, which typically follows the video demodulator, resulting in visible disturbances within the video image. It is important, therefore, to minimize the high-frequency gain. In short, it has been determined that one problem with adjusting the gain response in FIG. 4 (Prior Art) to remove gain from high-frequency disturbances is the processing delay between the measurement of the horizontal sync pulse level on one pulse and the application of a correction to next pulse.

As described herein, adjustments to the AGC frequency response can be made by introducing an intentional delay in the signal path of sufficient length to allow time for the measurement of the periodic component (e.g., horizontal sync pulse signal level) and for the application of an amplitude correction based upon this measurement to the same horizontal line in which the measurement was made. While implementing this delay can increase line buffer space requirements in digital solutions as horizontal line information is stored in memory circuitry during the delay, this delay advantageously allows for greater flexibility and efficiency in adjusting the gain response indicated in FIG. 4 (Prior Art). By adding this delay to the signal path, the horizontal sync-tip level can be measured and applied to the signal with little or no delay. A new gain adjustment can then be applied to the video signal before the horizontal sync-tip event has occurred. This signal path delay, therefore, has the advantageous effect of removing the delay for an AGC gain control loop based upon the horizontal sync-tip level or other periodic component. Removing this processing delay allows for a more general transfer function which can have improved high-frequency and low-frequency responses.

Figure 4:
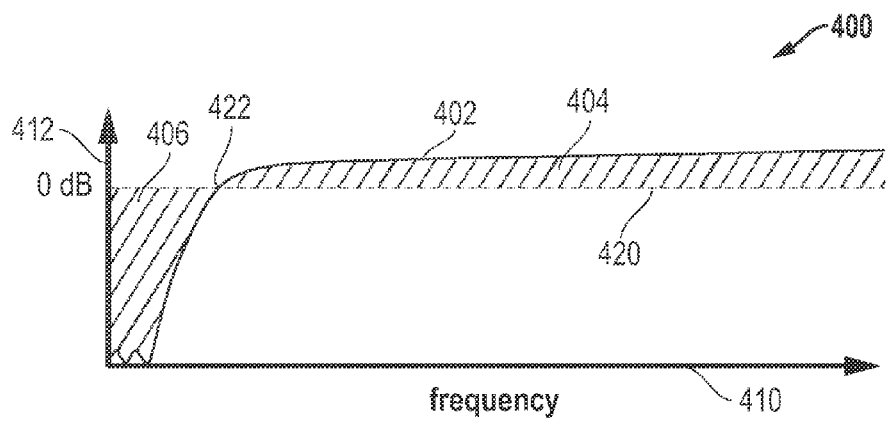
FIG. 4 (Prior Art) is a signal diagram for a frequency response for typical demodulator AGC circuitry for TV signals, such as CVBS signals.

The embodiments described herein allow for a demodulator AGC circuitry to be used in a wide variety of implementations as the delay elements provide greater flexibility in rejecting low-frequency noise while still limiting high-frequency gain. For example, where demodulator AGC circuitry is to be used for both analog TV (ATV) signals and cable TV signals, a prior frequency response as shown in FIG. 4 (Prior Art) can cause performance problems, for example, due to high-frequency noise from cable TV signals such as from poor quality cable amplifiers. The demodulator AGC circuitry described herein advantageously reduces low-frequency noise, such as may be experienced from power supply noise and from airplane interference in ATV signals, while still limiting or eliminating gain that would traditionally be applied to high-frequency noise that may exist in analog TV signals. It is further noted that the analog TV signals described herein can be received through cable connections, satellite receiver communications, over-air terrestrial broadcasts and/or through other communication mediums, as desired, while still taking advantage of the demodulator AGC circuitry with feed-forward delay to improve performance, as described herein.

Figure 5:
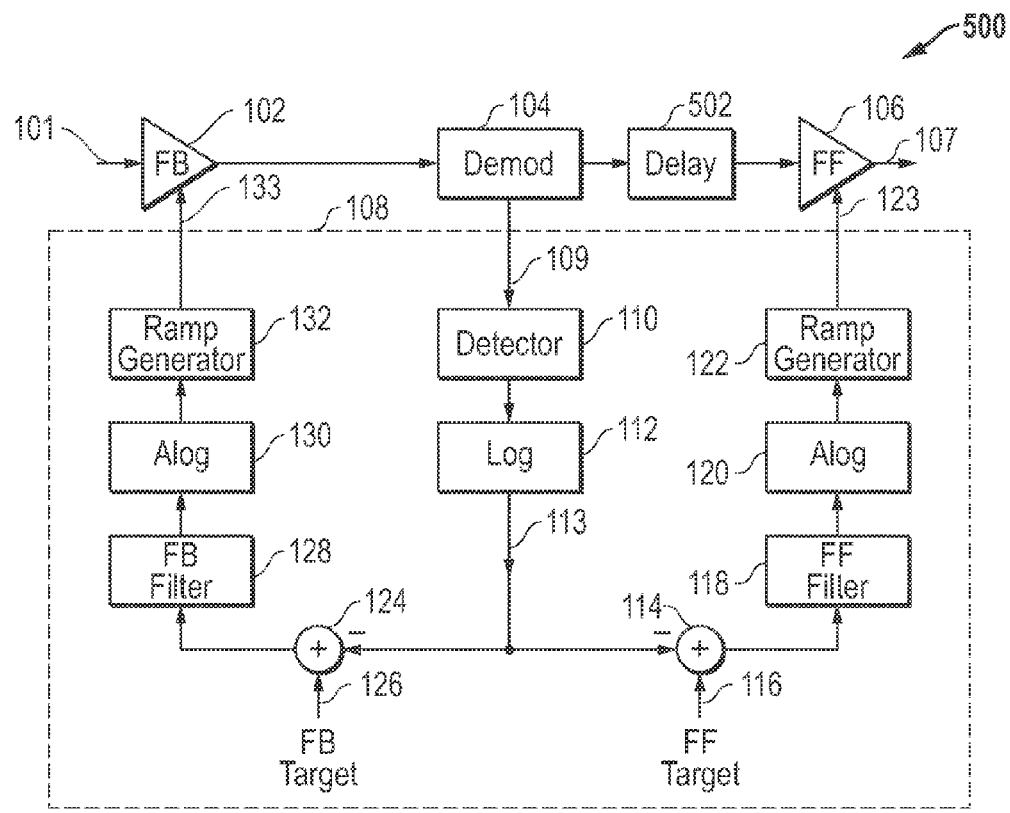
FIG. 5 is a block diagram of an embodiment for AGC circuitry including a delay block between the demodulator output and the feed-forward (FF) amplifier.

FIG. 5 is a block diagram of an embodiment 500 for AGC circuitry associated with an integrated TV receiver circuitry that demodulates incoming TV signals and that includes a delay block 502 between the output of demodulator (DEMOD) 104 and the programmable feed-forward (FF) amplifier 106. The amount of delay provided by the delay block 502 may also be programmable, if desired, and provides significant advantages in adjusting the gain response. Embodiment 500 is otherwise similar to embodiment 100 described above with respect to FIG. 1 (Prior Art).

Advantageously, by adding delay after the demodulator (DEMOD) 104, the adjustment to the feed-forward gain can be made within the same horizontal line as the gain detections was made. In particular, memory buffer circuitry within an integrated circuit that includes the circuitry described with respect to embodiment 500 can be used to store demodulated sample data output by the demodulator (DEMOD) 104, thereby allowing for delay to be applied to the demodulated TV signal before the feed-forward gain is applied by the programmable FF amplifier 106. As such, the delay block 502 can be implemented as buffer memory circuitry and related control circuitry that stores incoming demodulated TV signal data for at least a portion of a horizontal line, depending upon the amount of delay desired, and outputs this data after the desired amount of delay has occurred.

It is noted that the AGC circuitry can be configured to utilize a maximum sample rate equal to the horizontal line rate, if desired. For systems with 525 lines and 60 Hz, for example, the sample rate (fs) can be limited to fs=15.750 kHz. For systems with 625 lines and 50 Hz, for example, the sample rate (fs) can be limited to fs=15.625 kHz. It is also noted that the loop filters 118 and 128 can be implemented as a discrete-time filters. For these examples, therefore, the demodulator (DEMOD) 104 can be configured to operate at roughly 15,000 to 16,000 samples-per-second.

Figure 2:
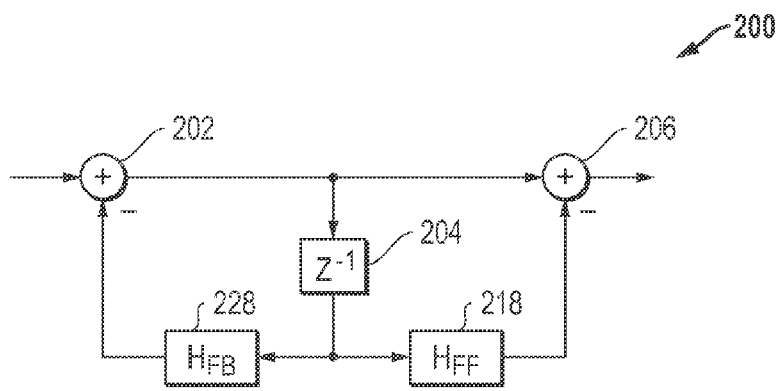
FIG. 2 (Prior Art) is a signal flow diagram that represents a transfer function for the demodulator AGC circuitry of FIG. 1 (Prior Art).
Figure 6:
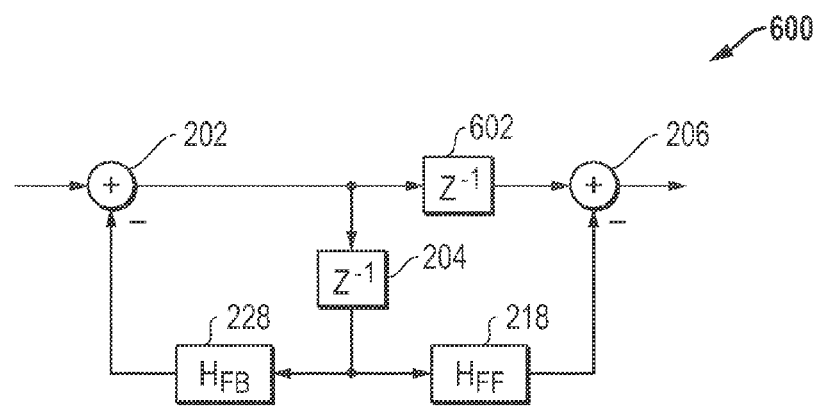
FIG. 6 is a signal flow diagram that represents a transfer function for the demodulator AGC circuitry of FIG. 5.

FIG. 6 is a signal flow diagram 600 that represents the transfer function for the demodulator AGC circuitry of embodiment 500. Diagram 600 includes an additional delay 602 that is associated with the delay block 502 in FIG. 5. Diagram 600 is otherwise similar to embodiment 200 described above with respect to FIG. 2 (Prior Art).

Figure 3:
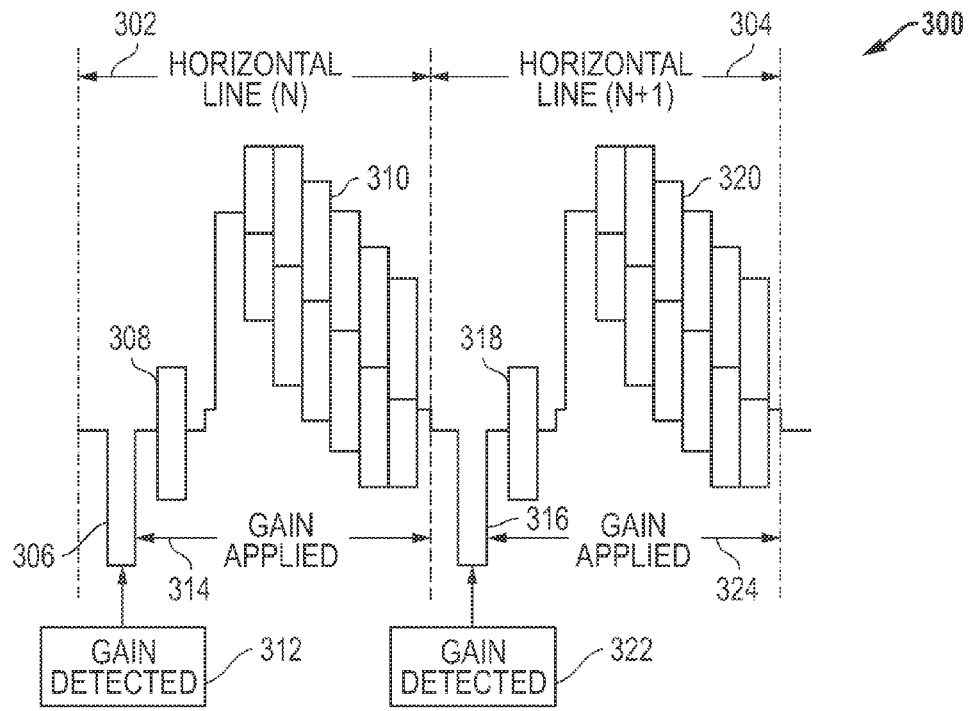
FIG. 3 (Prior Art) is a representative signal diagram for an incoming TV signal in the form of a CVBS (Color, Video, Blanking, and Sync) signal.
Figure 7:
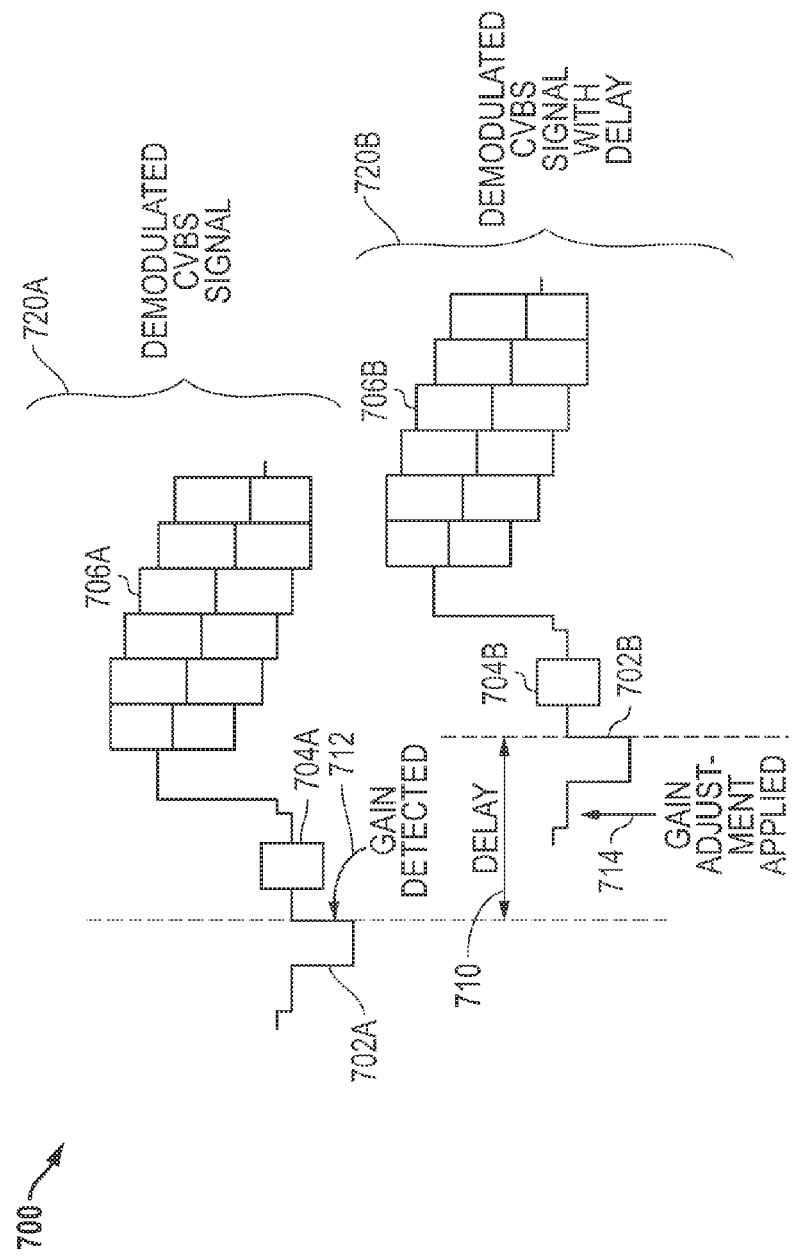
FIG. 7 is a representative signal diagram for an incoming TV signal in the form of a CVBS (Color, Video, Blanking, and Sync) signal.

FIG. 7 is a representative signal diagram 700 for an incoming TV signal in the form of a CVBS (Color, Video, Blanking, and Sync) signal including a horizontal line 720A and a delayed version 720B for this horizontal line. In particular, the horizontal line 720A represents a horizontal line for a demodulated CVBS signal and includes a horizontal sync tip signal 702A, a color calibration signal 704A, and visible color content information 706A, similar to the CVBS signal described with respect to FIG. 3 (Prior Art). The horizontal line 720B represents a version of the horizontal line 720A that has been delayed by a delay amount (DELAY) 710 and also includes a horizontal sync tip signal 702B, a color calibration signal 704B, and visible color content information 706B that match the similar elements in horizontal line 720A. It is noted that the delay can be selected, as desired, depending upon the amount of memory storage available to store horizontal line data. One example value is to provide a delay amount (DELAY) 710 of about 10 microseconds. Other values for the delay could also be implemented, and the delay value could also be programmable, if desired.

For the embodiment 700 depicted, the gain level is detected during the horizontal sync tip 702A, as represented by arrow 712. As described above, a feed-forward gain adjustment can be determined, for example, to reach a desired target gain for the demodulator AGC circuitry. This gain adjustment can then be applied to the delayed version of the horizontal line 720B. It is noted that this gain adjustment can be applied as a ramp value over a portion of the horizontal line or over the entire horizontal line, can be applied as a stair-step value applied at one point in the horizontal line, or can be applied using some other desired technique. For the embodiment 700 depicted, it is assumed that the gain adjustment is being applied at a beginning portion of the horizontal line, as represented by arrow 714. This beginning portion of the horizontal line is often called the "front porch" portion of a CVBS signal.

With the signal path delay, the transfer function of the AGC circuitry changes to the following representation:

$$H(z) = \frac{b_0 + (b_1)z^{-1} + (b_2)z^{-2} + (b_3)z^{-3} + (b_4)z^{-4}}{1 + (a_1)z^{-1} + (a_2)z^{-2} + (a_3)z^{-3} + (a_4)z^{-4}} = \frac{b_0 \cdot [1 + (b'_1)z^{-1} + (b'_2)z^{-2} + (b'_3)z^{-3} + (b'_4)z^{-4}]}{1 + (a_1)z^{-1} + (a_2)z^{-2} + (a_3)z^{-3} + (a_4)z^{-4}}$$

With this form, the gain level can be adjusted using the $b_0$ coefficient to ensure that no frequencies have a gain greater than 0 dB. This result is useful, for example, in cases where good low-frequency flutter attenuation is desired, where high-frequency disturbances do not need significant attenuation, and where it is desired not to amplify these high-frequency disturbances. The embodiments described herein provide these advantages.

In one implementation, the feed-forward filter can be configured to simply cancel the error term. This feed-forward loop implementation will in effect provide infinite attenuation of the error at all frequencies. The feedback loop is configured to attenuate low frequency flutter. Representations for these filter implementations can be provided as follows:

$$H(z) = \frac{1 - H_{\mathit{ff}}}{1 - (H_{\mathit{fb}})z^{-1}} = 0; \text{ where } H_{\mathit{ff}} = 1$$

For a minimum delay, the Hsync pulse level is measured by the end of the Hsync pulse in a first horizontal line. Using the delay described herein, the error correction can then be applied during a non-visible portion of the horizontal line, for example, just before the Hsync pulse occurs. For this implementation, the gain adjustment is assumed to be made in one gain step rather then as a ramp or through another technique.

This single gain step implementation effectively regulates the Hsync levels for all frequencies.

One potential disadvantage to a single gain step implementation of the amplitude correction is that as a horizontal line progresses into the visual content portion of the signal, the delay between the gain adjustment and the gain changes due to the amplitude disturbance accumulates. This accumulation has the effect that the left side of the display has a smaller residual disturbance than the right side. At the extreme right-hand side, near the subsequent Hsync pulse, the AGC circuitry has about one line of delay, and the AGC loop looks similar to the prior art response. As such, there is a varying response along the horizontal line. For low-frequency flutter (e.g., frequencies less than a few hundreds of Hertz), the variation along the line is not perceptible. High-frequency flutter (e.g., frequencies in the few thousands of Hertz), however, can be easily seen, leading to potential performance degradations.

To resolve this potential problem with respect to single-step application of corrections, the error correction can be applied across more of the horizontal line by increasing the delay amount and storing more of the horizontal line within delay memory buffer circuitry. For example, the signal path can be delayed a full horizontal line, if desired, by storing data for the full horizontal line in the delay memory. In this case, the gain adjustment can then be made gradually along the entire horizontal line. For example, the gain adjustment can be applied as a linear ramp, according to a higher order polynomial, or in some other manner across a portion of the horizontal line or across the entire horizontal line, if desired. It is noted that a gain adjustment can be further implemented to closely follow the accumulating amplitude disturbance and result in better AGC performance across the entire line.

It is again noted that the feed-forward amplitude correction can be applied as a single stair-step gain correction, can be applied more gradually through a ramp gain correction, or can be applied using some other desired correction shape. While a stair-step correction is applied at a selected point in the horizontal line, a ramp correction is applied gradually over some or all of the horizontal line. As such, the ramp correction requires more of the horizontal line to be stored. However, a ramp correction can improve the resulting image being viewed. Further, if desired, a higher order correction could be applied across some or all of the horizontal line. For example, where an AGC is configured to operate at a horizontal line rate of between 15 to 16 kHz, an interpolator can be used to up-sample the gain correction changes from the horizontal line rate to the data-path sample rate of the demodulator output signal (e.g., 25 MHz). A stair-step gain correction can then be considered as a 0-order interpolation (e.g., sample-and-hold). A ramp gain correction can be considered as a first ($1^{st}$) order interpolation. Higher order interpolator circuitry could also be used, as desired, to provide second ($2^{nd}$) order and above interpolations of the amplitude error signal for applying the gain correction signals to the feed-forward amplifier. Other variations could also be used for applying the amplitude correction to the feed-forward amplifier, as desired.

It is further noted that the number of samples generated by the demodulator for each horizontal line depends upon the sampling rate for the demodulator. Depending upon the type of correction being applied, some or all of the horizontal line samples from the demodulator will be stored in memory. Further, as described herein, the amplitude correction can be applied using different techniques, as desired. With respect to a stair-step correction, it is noted that one location point for applying a stair-step amplitude correction is during the front-porch portion of a CVBS signal that occurs before the horizontal sync-tip pulse. The gain step could also be applied during the back-porch portion of a CVBS signal that occurs after the horizontal sync-tip pulse and before the visible color information. However, this back-porch location can cause problems with some video decoders that lock a PLL (phase locked loop) to the chroma burst information that is included within this back-porch region.

Still further, it is noted that the timing delay can be fixed or can be made to be adjustable or programmable, if desired. For example, the integrated circuit can adjust the size of the delay based upon operating conditions. Further, the size of the delay could be programmed by external circuitry or an external user depending upon the operation desired. The location of the gain detection could also be implemented as an adjustable and/or programmable location within the horizontal line, if desired. Further, the coefficients for the loop filters could also be implemented as adjustable and/or programmable coefficients, if desired. Still further, the type of correction applied (e.g., stair-step, ramp, etc.) could also be implemented as an adjustable and/or programmable correction type, if desired. These adjustable and/or programmable features can provide further flexibility and efficiencies to the disclosed embodiments.

Figure 8:
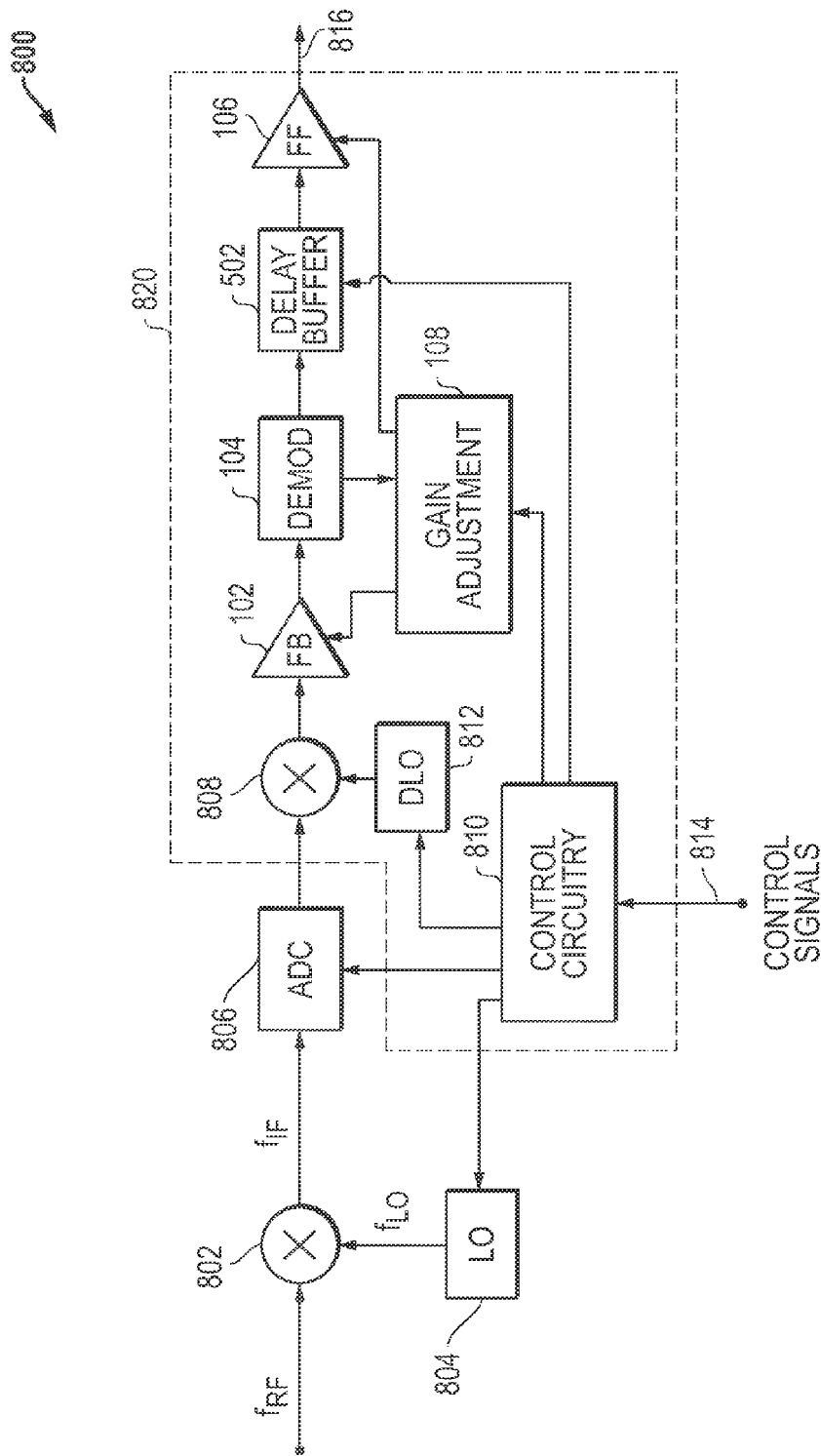
FIG. 8 is a block diagram of a TV receiver system that utilizes a delay buffer before the feed-forward amplifier to improve the performance of AGC circuitry.

FIG. 8 is a block diagram of a TV receiver system 800 that utilizes delay buffer circuitry for the delay block 502 to improve the performance of AGC circuitry. As depicted a mixer 802 receives input signals at a radio frequency ($f_{RF}$), such as between 50 MHz and 1 GHz. The mixer 802 also receives mixing signals ($f_{LO}$) from local oscillator (LO) circuitry 804 and outputs signals at a down-converted intermediate frequency ($f_{IF}$), which can be, for example, a low-IF frequency or a zero-IF frequency, if desired. The down-converted signals are then digitized by analog-to-digital converter circuitry (ADC) 806. If not already converted to baseband, the digital signals from the ADC 806 can then be provided to a digital mixer 808 where they can be further down-converted to baseband signals using digital mixing signals from a digital local oscillator (DLO) 812. The baseband signals can then be processed by the programmable FB amplifier 102, the demodulator (DEMOD) 104, the delay buffer circuitry 502, the programmable FF amplifier 106, and the gain adjustment circuitry 108, as described above. Control circuitry 810 can also be included that provides controls signals to the LO circuitry 804, the ADC 806, the DLO circuitry 812, the gain adjustment circuitry 108 and the delay buffer circuitry 502. The dotted line 820 represents circuitry that could be implemented, if desired, using digital signal processor (DSP) circuitry, a micro-controller and/or other desired digital circuitry.

As described herein, the delay buffer circuitry 502 advantageously allows the feed-forward gain adjustment to occur within the same horizontal line as which the gain level is detected. The demodulated and gain-adjusted output signals 816 from the programmable FF amplifier 106 can be further processed and/or used by additional circuitry, as desired. Further, control signals 814 can be provided to the control circuitry 810 from additional circuitry, as desired. Further, it is noted that the embodiment 800 can be integrated on the same integrated circuit, if desired. In addition, the control signal 814 could be provided from circuitry external to this integrated circuit, and the output signals 816 could be provided to circuitry external to this integrated circuit, as desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Automatic gain control system for analog television signals, comprising:
    demodulator circuitry configured to receive a modulated analog television (ATV) signal and to output a demodulated ATV signal;
    amplitude detector circuitry configured to measure amplitude levels for periodic components within a plurality of horizontal lines for the demodulated ATV signal and to output amplitude level indication signals;
    feed-forward error correction circuitry configured to compare the amplitude level indication signals to a target feed-forward amplitude level and to generate feed-forward error signals;
    feed-forward amplitude correction circuitry configured to receive the feed-forward error signals and to generate feed-forward amplitude correction signals;
    delay circuitry configured to receive the demodulated ATV signal and to output a delayed version of the demodulated ATV signal after a delay amount; and
    amplifier circuitry configured to receive the delayed version of the demodulated ATV signal, to receive the feed-forward amplitude correction signals, and to amplify the delayed version of the demodulated ATV signal based upon the feed-forward amplitude correction signals such that an amplitude level before the periodic component within each horizontal line is adjusted based upon the periodic component within that horizontal line.

2. The automatic gain control system of claim 1, wherein the periodic components comprise horizontal synchronization pulse signals.

3. The automatic gain control system of claim 2, wherein the horizontal lines further comprise visible color content information positioned after the horizontal synchronization pulse signals.

4. The automatic gain control system of claim 2, wherein an amplitude correction signal for each horizontal line is applied as a ramped correction signal across at least a portion of the horizontal line starting before the horizontal synchronization pulse.

5. The automatic gain control system of claim 2, wherein an amplitude correction signal for each horizontal line is applied as a stair-step correction signal at a position before the horizontal synchronization pulse.

6. The automatic gain control system of claim 2, wherein the feed-forward amplitude correction circuitry comprises interpolator circuitry configured to generate amplitude correction signals based upon a second order or higher interpolation of the feed-forward error signals.

7. The automatic gain control system of claim 1, further comprising feedback error correction circuitry configured to compare the amplitude level indication signals to a target feedback amplitude level and to generate feedback error signals, feedback amplitude correction circuitry configured to receive the feedback error signals and to generate feedback amplitude correction signals, and feedback amplifier circuitry configured to receive the feedback amplitude correction signals and to apply them to the modulated ATV signal.

8. The automatic gain control system of claim 1, wherein the modulated ATV signals comprise CVBS (Color, Video, Blanking, and Sync) signals.

9. The automatic gain control system of claim 1, wherein the delay circuitry comprises buffer circuitry configured to store at least a portion of each horizontal line.

10. The automatic gain control system of claim 9, wherein the portion of each horizontal line stored within the buffer circuitry is programmable.

11. The automatic gain control system of claim 9, wherein the buffer circuitry is configured to store an entire horizontal line.

12. A method for gain control of analog television signals, comprising:
    demodulating a modulated ATV signal to produce a demodulated ATV signal;
    detecting amplitude levels for periodic components within a plurality of horizontal lines for the demodulated ATV signal;
    comparing the amplitude levels to a target feed-forward amplitude level to produce feed-forward error signals;
    generating feed-forward amplitude correction signals based upon the feed-forward error signals;
    delaying the demodulated ATV signal by a delay amount to produce a delayed version of the demodulated ATV signal; and
    amplifying the delayed version of the demodulated ATV signal based upon the feed-forward amplitude correction signals such that an amplitude level before the periodic component within each horizontal line is adjusted based upon the periodic component in that horizontal.

13. The method of claim 12, wherein the detecting step comprises detecting amplitude levels for horizontal synchronization pulse signals within the horizontal lines.

14. The method of claim 13, wherein the generating step comprises generating an amplitude correction signal for each horizontal line that is a ramped correction signal applied across at least a portion of the horizontal line including the horizontal synchronization pulse.

15. The method of claim 13, wherein the generating step comprises generating an amplitude correction signal for each horizontal line that is a stair-step correction signal applied at a position before the horizontal synchronization pulse.

16. The method of claim 13, wherein the generating step comprises generating amplitude correction signals based upon second order or higher interpolations of the feed-forward error signals.

17. The method of claim 12, further comprising comparing the amplitude levels to a target feedback amplitude level to produce feedback error signals, generating feedback amplitude correction signals based upon the feedback error signals, and amplifying the modulated ATV signal based upon feedback amplitude correction signals.

18. The method of claim 12, wherein the modulated ATV signals comprise CVBS (Color, Video, Blanking, and Sync) signals.

19. The method of claim 12, wherein the delaying step comprises storing at least a portion of each horizontal line in buffer circuitry.

20. The method of claim 19, further comprising adjusting the portion of each horizontal line stored within the buffer circuitry based upon a programmable value.

21. The method of claim 19, wherein the delaying step comprises storing an entire horizontal line within the buffer circuitry.

* * * * *